(12) United States Patent
Shaikh et al.

(10) Patent No.: US 8,340,670 B2
(45) Date of Patent: Dec. 25, 2012

(54) REGISTERING WITH SIP SERVERS FOR IMS USING A FULLY QUALIFIED DOMAIN NAME

(75) Inventors: Imtiaz Shaikh, Pleasant Hill, CA (US); Xuming Chen, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 370 days.

(21) Appl. No.: 12/637,283

(22) Filed: Dec. 14, 2009

(65) Prior Publication Data

US 2011/0142015 A1 Jun. 16, 2011

(51) Int. Cl.
*H04W 4/00* (2009.01)
(52) U.S. Cl. .......... 455/435.1; 455/422.1; 455/435.2; 455/435.3; 455/435.4; 455/435.5
(58) Field of Classification Search ........... 455/435.1, 455/435.2, 435.3, 435.4, 435.5
See application file for complete search history.

(56) References Cited

U.S. PATENT DOCUMENTS

| | | | |
|---|---|---|---|
| 2002/0087674 A1* | 7/2002 | Guilford et al. | 709/223 |
| 2005/0176428 A1* | 8/2005 | Gabor et al. | 455/435.1 |
| 2008/0045214 A1* | 2/2008 | Wen et al. | 455/435.1 |
| 2008/0254791 A1* | 10/2008 | Oyama et al. | 455/435.1 |
| 2009/0298500 A1* | 12/2009 | Beckmann et al. | 455/435.1 |
| 2010/0015958 A1* | 1/2010 | Dell'Uomo et al. | 455/414.1 |

* cited by examiner

*Primary Examiner* — Kamran Afshar
*Assistant Examiner* — Sayed T Zewari (57) ABSTRACT

A fully qualified domain name may be used to identify a session initiation protocol server with which a client device may connect to IMS services in a network. In one implementation, a network device may receive a request to register a client device for IMS services. The network device may determine a fully qualified domain name corresponding to one or more SIP servers that process SIP signaling packets for the client device and transmit a message initiating resolution of the fully qualified domain name into a plurality of IP addresses.

22 Claims, 8 Drawing Sheets

| FQDN (410) | NUMBER ACTIVE CLIENTS (420) | STATUS (430) |
|---|---|---|
| cscf1.abc.com | x | AVAILABLE |
| cscf2.abc.com | y | AVAILABLE |
| cscf3.abc.com | 0 | OFFLINE |
| ⋮ | | |

REGISTERING WITH SIP SERVERS FOR IMS USING A FULLY QUALIFIED DOMAIN NAME

BACKGROUND

In an increasingly networked world, more and more traffic, such as data, voice, and video, is transmitted over public and proprietary networks. Wireless networks, in particular, are becoming increasingly popular as networks through which subscribers obtain both voice services (e.g., telephone calls) and data services (e.g., email and web surfing).

Internet Protocol (IP) multimedia subsystem (IMS) is a standard used to deliver IP multimedia to client devices. Under IMS, communication devices, such as mobile telephone devices, may connect to a control server that monitors and controls the connectivity of the mobile device to the telecommunication network. The telecommunications network may include a number of instances of the control servers. When the mobile device first connects to the network, it may connect to one of the control servers, with which it will subsequently interact.

DETAILED DESCRIPTION

The following detailed description refers to the accompanying drawings. The same reference numbers in different drawings may identify the same or similar elements. Also, the following detailed description does not limit the invention.

Implementations described herein may include a telecommunication network for interconnecting a number of client devices. The telecommunication network may be, for example, a long term evolution (LTE) based network or a 3rd Generation Partnership Project (3GPP or 3G) based network, that provides IMS services to the client devices. When initially registering for the IMS services, a fully qualified domain name (FQDN) may be used to identify a session initiation protocol (SIP) server with which the client device may subsequently communicate. IP addresses corresponding to the FQDN may be resolved via a lookup at a domain name system (DNS) server, to obtain one or more numeric IP address that the client may use to communicate with the SIP server. If the client device is unable to connect or loses connection with the SIP server, the client device may try to reconnect with another SIP server using an alternative one of the returned IP addresses.

Figure 1:
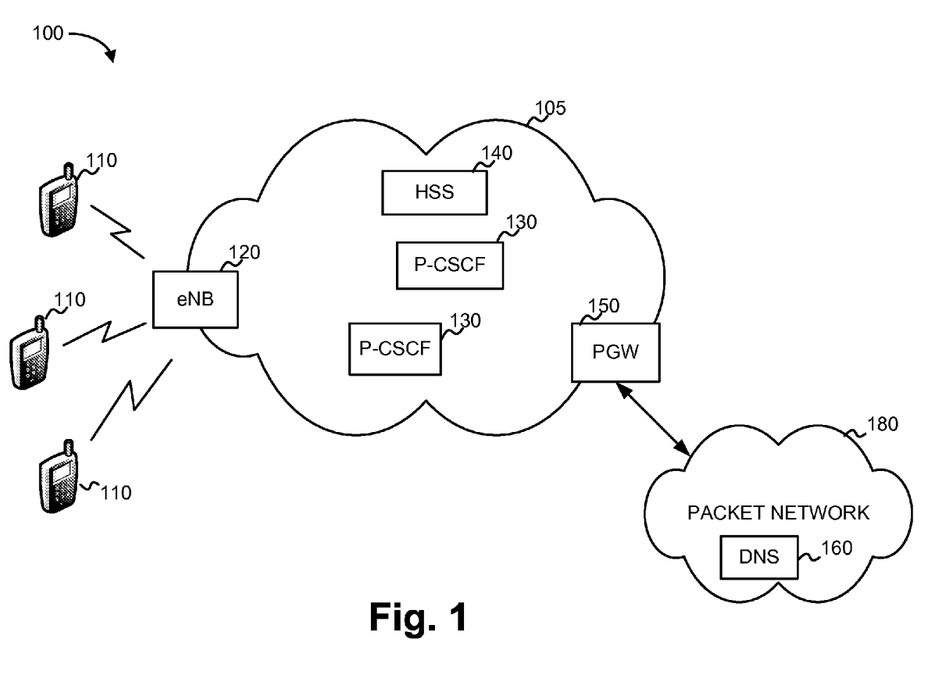
FIG. 1 is a diagram illustrating an exemplary system.

FIG. 1 is a diagram illustrating an exemplary system 100. System 100 may generally illustrates a wireless communication system based on the Long Term Evolution (LTE) mobile communication standard. In alternative implementations, other communication standards could be used.

As shown in FIG. 1, system 100 may include one or more client devices 110, such as mobile phones, that connect to a first network 105. A second network 180 may connect to first network 105. First network 105 may represent elements in a network designed to provide wireless telecommunication access to client devices 110. First network 105 may connect to second network 180, which may be a packet-based network, such as the Internet.

Client devices 110 may generally include devices designed to communicate with network 105. Client devices 110 may include, for example, mobile telephones, smart phones, electronic notepads, laptops, personal computers, and/or personal digital assistants (PDAs). Client devices 110 may establish wireless communication sessions with network 105. The wireless communication sessions may be used for voice (e.g., telephone calls) or data sessions.

As previously mentioned, first network 105 may include components of a wireless network. In one exemplary implementation, and as illustrated, first network 105 may include components that implement IMS services based in an LTE network. Other network technologies, such as International Mobile Telecommunications-2000 ("3G"), or second-generation wireless telephone technology ("2G"), may alternatively or additionally be implemented.

As particularly shown in FIG. 1, the components of first network 105 may include radio access node (eNB) 120 (also called base station 120 herein), proxy call session control function (P-CSCF) servers 130, home subscriber server (HSS) 140, packet gateway (PGW) 150, and domain name system (DNS) server 160. DNS server 160, although shown in second network 180, may alternatively or additionally be implemented in first network 105.

Base station 120 may provide an interface for client devices 110. Base station 110 may include, from a network access perspective, the PHYsical (PHY) layer, a medium access control (MAC) layer, a radio link control (RLC) layer, and a packet data control protocol (PDCP) layer. Base station 110 may also offer radio resource control (RRC) functionality corresponding to the control plane. Base station 110 may perform many functions including radio resource management, admission control, scheduling, cell broadcast, ciphering/deciphering of user and control plane data, and compression/decompression of user plane packet headers.

P-CSCF servers 130 may each implement a SIP proxy server that processes SIP signaling packets in first network 105. Each P-CSCF server 130 may generally act as the first point of contact for client device 110 for IMS services. Each client device 110 may be assigned a P-CSCF server 130 during registration of the client device. P-CSCF server 130 may subsequently operate in the signaling path of IMS messages.

HSS 140 may include computing devices that implement a master database that supports network entities, such as P-CSCF servers 130. HSS 140 may store subscription-related information for subscribers and may perform authentication and authorization services for the subscribers. HSS 140 may additionally store and provide information about the subscriber's location and IP information. As described in more detail below, HSS 140, during initial registration processing of a client device 110, in network 105, may provide, based on a domain name (e.g., a FQDN), the client device with IP addresses of P-CSCF servers 130 to which the client device should connect.

PGW 150 may provide connectivity to external networks, such as second network 180. A client device 110 may have simultaneous connectivity with more than one PGW to multiple additional networks. PGW 150 may perform, for example, policy enforcement, packet filtering for each user, charging support, lawful interception, and/or packet screening.

DNS server 160 may include one or more servers that act to translate text-based domain names into numerical IP addresses that are used to route information in networks, such as networks 105 and 180. DNS server 160 may be implemented in networks 105 and/or 180 as a distributed server system in which different servers handle different portions of a hierarchy of domains.

Second network 180 may include, for example, a public packet-based network, such as the Internet. Second network 180 may include DNS servers, such as DNS server 160.

Although FIG. 1 illustrates exemplary components of system 100, in other implementations, system 100 may include additional, fewer, different, or differently arranged components than those illustrated in FIG. 1 and described herein. For example, first network 105 may include many base stations 120.

Figure 2:
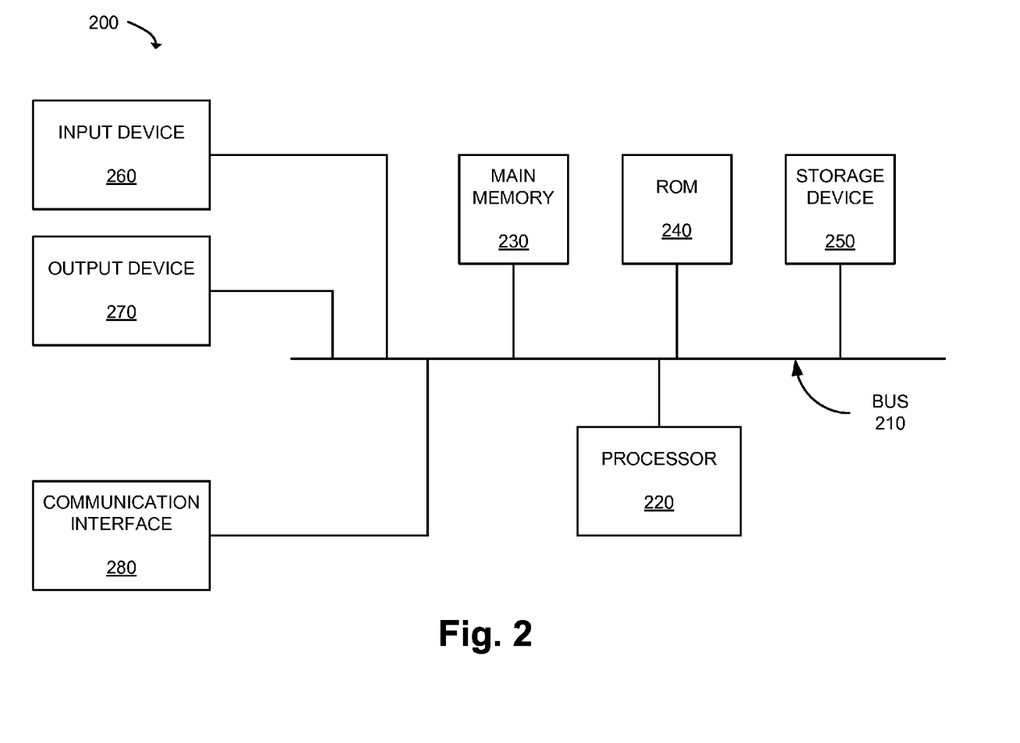
FIG. 2 is a diagram of exemplary components of a device, such as a network device or a client device.

FIG. 2 is a diagram of exemplary components of a device 200, which may correspond to a network device (e.g., server, database, HSS 140, P-CSCF server 130, PGW 150, or other network entity) in networks 105/180 or a client device 110. As shown in FIG. 2, device 200 may include a bus 210, a processor 220, a main memory 230, a read only memory (ROM) 240, a storage device 250, an input device 260, an output device 270, and a communication interface 280. In another implementation, device 200 may include additional, fewer, different, or differently arranged components than are illustrated in FIG. 2.

Bus 210 may include a path that permits communication among the components of device 200. Processor 220 may include a processor, a microprocessor, or processing logic (e.g., an application specific integrated circuit (ASIC) or a field programmable gate array (FPGA)) that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive, or a removable form of memory, such as a flash memory.

Input device 260 may include a mechanism that permits an operator to input information to device 200, such as a keyboard, a mouse, a button, a pen, a touch screen, voice recognition and/or biometric mechanisms, etc. Output device 270 may include a mechanism that outputs information to the operator, including a display, a light emitting diode (LED), a speaker, etc. Communication interface 280 may include any transceiver-like mechanism that enables the client/server entity to communicate with other devices and/or systems. For example, communication interface 280 may include mechanisms for communicating with another network device. In some implementations, input device 260 and/or output device 270 may not be implemented by device 200. For example, device 200 may represent a network device such as base station 120, P-CSCF 130, HSS 140, PGW 150, or DNS server 160. In these situations, device 200 may be a "headless" device that does not explicitly include an input or an output device.

As will be described in detail below, device 200 may perform certain operations relating to the registration of a client device 110 for IMS services. Device 200 may perform these operations in response to processor 220 executing software instructions contained in a computer-readable medium, such as main memory 230. A computer-readable medium may be defined as a logical or physical memory device. A logical memory device may include a space within a single physical memory device or spread across multiple physical memory devices.

The software instructions may be read into main memory 230 from another computer-readable medium, such as storage device 250, or from another device via communication interface 280. The software instructions contained in main memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

In one particular implementation, software instructions, such as instructions stored in main memory 230 of device 200 implementing HSS 140, may be designed to respond to initial requests from client devices 110, such as IMS registration requests, with a FQDN corresponding to one or more P-CSCF servers 130. Software instructions, such as instructions stored in main memory 230 of device 200 implementing PGW 150, may be designed to respond to the FQDN received from HSS 140 to issue a DNS query to DNS server 160 and on behalf of client device 110.

Although FIG. 2 illustrates exemplary components of device 200, in other implementations, device 200 may include additional, fewer, different, or differently arranged components than those illustrated in FIG. 2 and described herein.

Figure 3:
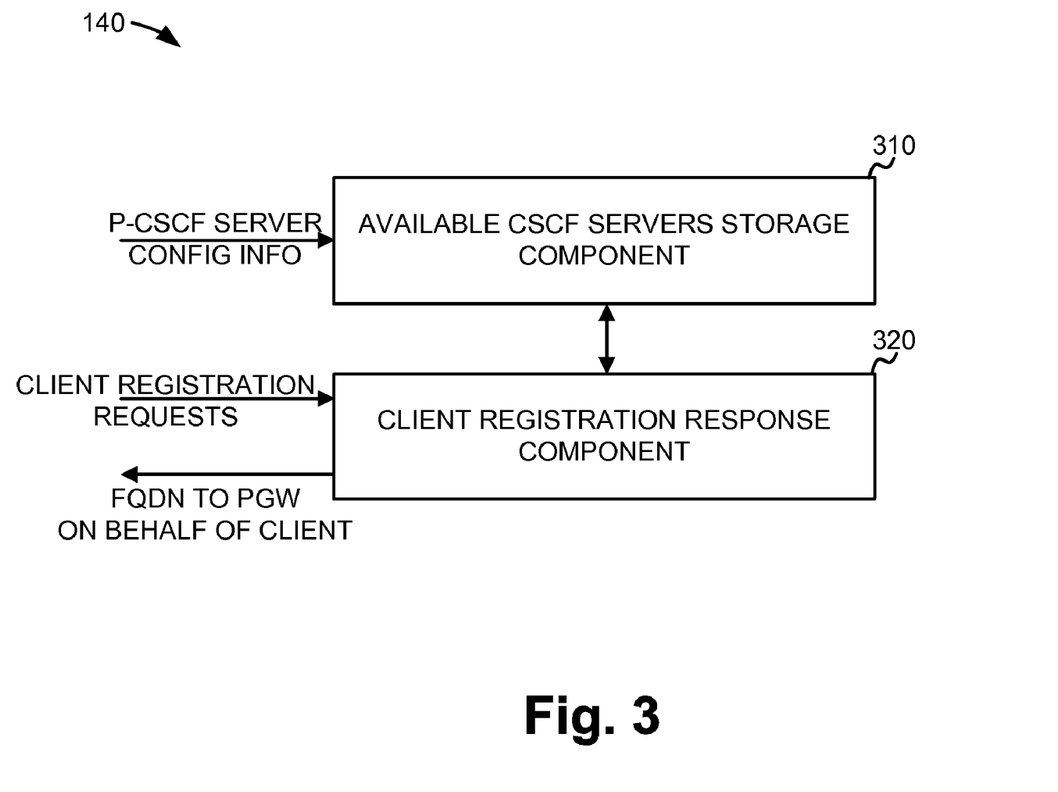
FIG. 3 is a diagram illustrating exemplary functional components of a network device shown in FIG. 1.

FIG. 3 is a diagram illustrating exemplary functional components of HSS 140. The functional components illustrated in FIG. 3 may be implemented by hardware (e.g., one or more processors or other processing logic, and one or more memories) or a combination of hardware and software in device 200. As shown in FIG. 3, HSS 140 may include available CSCF servers storage component 310 and client registration response component 320.

Available CSCF servers storage component 310 may receive and maintain information relating to P-CSCF servers 130 that are available to be used by client devices 110 in first network 205. Available CSCF servers storage component 310 may store this information in, for example, a database or a file. In one implementation, the information relating to available P-CSCF servers 130 may be manually entered by a network administrator. In another implementation, information relating to the available P-CSCF servers 130 may be automatically determined using, for example, a network discovery protocol implemented by HSS 140 or another device 200.

Figure 4:
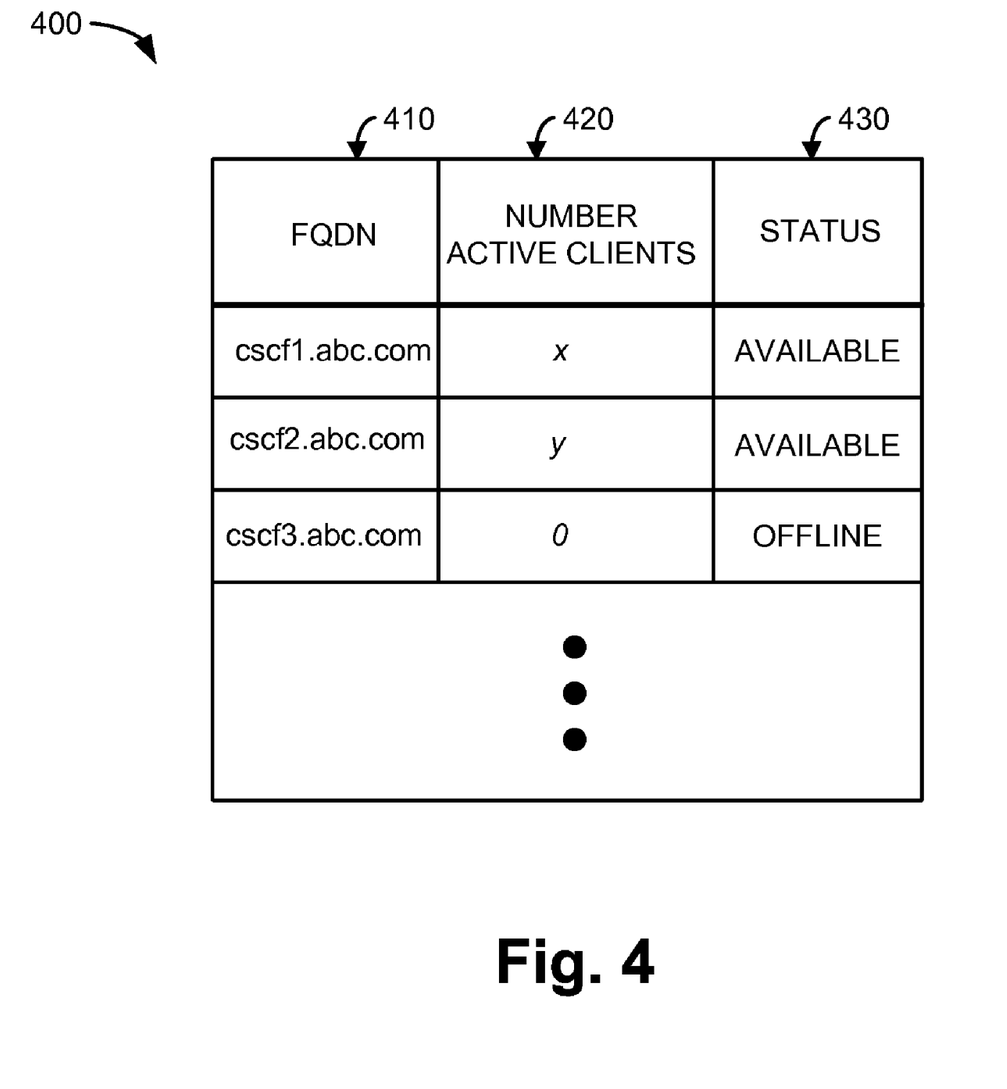
FIG. 4 is a diagram of a table illustrating exemplary information stored by the functional components shown in FIG. 3.

FIG. 4 is a diagram of a table 400, such as a table or database stored in computer-readable media as part of HSS 140, illustrating exemplary information stored by available CSCF servers storage component 310. Each row of table 400 may correspond to a P-CSCF server 130. Each row may include a FQDN field 410, a number of active clients field 420, and a status field 430.

FQDN field 410 may include the fully qualified domain name corresponding to a particular P-CSCF server 130 or set of P-CSCF servers 130. In table 400, three exemplary rows are given, corresponding to three P-CSCF server sets 130 that have the domain names: (1) cscf1.abc.com, (2) cscf2.abc.com, and (3) cscf3.abc.com.

Number of active clients field 420 may store a value indicating the number of active client devices 110 assigned to the P-CSCF servers 130 for a domain name. Field 420 may generally be used to store an indication of the load being processed by a particular domain name. In one implementation, HSS 140 may increment or decrement the number of active clients field 420 as new client devices 110 register with HSS 120 or as client devices 110 are no longer served by the IMS system. Additionally, in some implementations, P-CSCF servers 130 may periodically or occasionally disseminate load information to HSS 140, which may be used to update number of active clients field 420.

Status field 430 may store a label indicting the current status of one or more of the corresponding P-CSCF servers 130. The status information may include, for example, a label such as "available" or "offline," potentially indicating that the corresponding P-CSCF server(s) are functioning normally or are not functioning. In one implementation, P-CSCF servers 130 may occasionally communicate with HSS to inform HSS 140 of its current status.

Referring back to FIG. 3, HSS 140 may include client registration response component 320. Client registration response component 320 may generally act to process initial registration requests from client devices 110. In particular, in one implementation, client registration response component 320 may receive client registration requests to register for IMS services, determine a FQDN corresponding to one or more P-CSCF servers 130 to assign to the client device, and transmit the FQDN to PGW 150 on behalf of the client device. The FQDN may be looked-up from field 410 in table 400.

Figure 5:
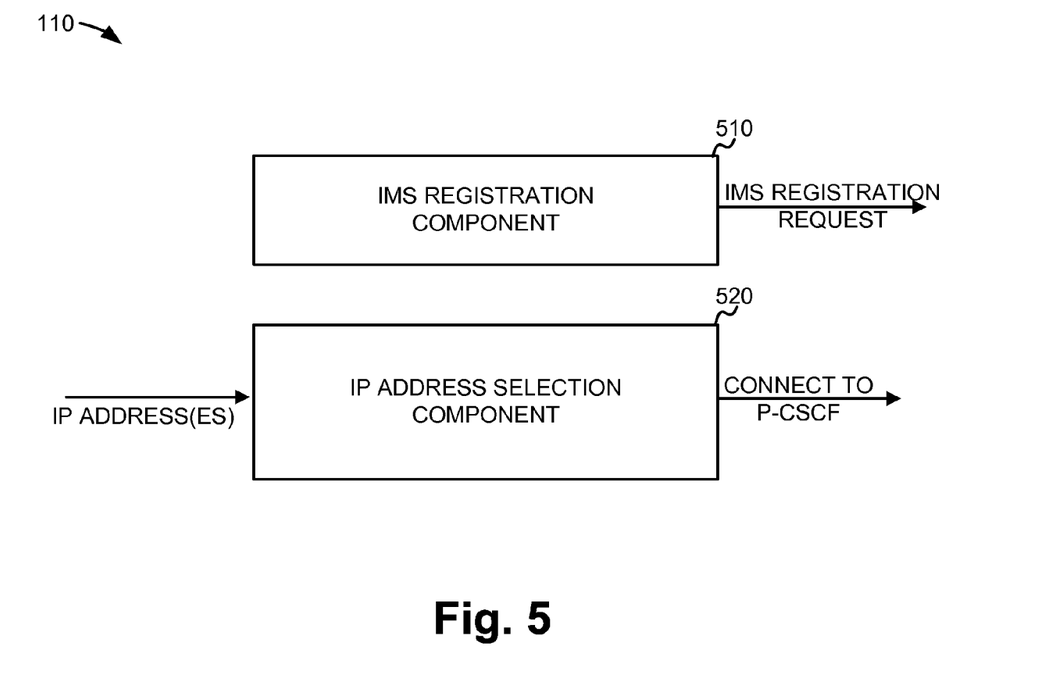
FIG. 5 is a diagram illustrating exemplary functional components of a client device relating to registration of IMS services.

FIG. 5 is a diagram illustrating exemplary functional components of client device 110 relating to registration for IMS service, as described herein. The functional components illustrated in FIG. 5 may be implemented by hardware (e.g., one or more processors or other processing logic, and one or more memories) or a combination of hardware and software in device 200. As shown in FIG. 5, client device 110 may include IMS registration component 510 and IP address selection component 520.

IMS registration component 510 may operate to register client device 110 for IMS services in network 105. The registration may occur, for example, when device 110 initially communicates with network 105. IMS registration component 510 may send a registration request message to HSS 140. As part of the registration process, HSS 140 may send a FQDN to DNS server 160 on behalf of client device 110. In one implementation, HSS 140 may send the FQDN to PGW 150, which may act as the DNS resolver that makes the actual DNS query to DNS server 160 on behalf of client device 110. Alternatively, HSS 140 may send the FQDN to client device 110, which may resolve the FQDN using DNS server 160.

IP address selection component 520 may receive one or more IP addresses in response to the DNS query made by PGW 150. The received addresses may correspond to P-CSCF servers 130 in network 105. IP address selection component 520 may select one of the received IP addresses and initially connect to the P-CSCF server 130 corresponding to the selected IP address. If the connection to the selected P-CSCF server 130 is lost, such as if the P-CSCF server goes offline, IP address selection component 520 may select another one of the received IP addresses and connect to the P-CSCF server 130 corresponding to that IP address. In one implementation, IP address selection component 520 may select the first IP address received as the IP address to use. In another possible implementation, IP address selection component 520 may select another IP address to use, such as one randomly chosen from the received IP addresses.

Figure 6:
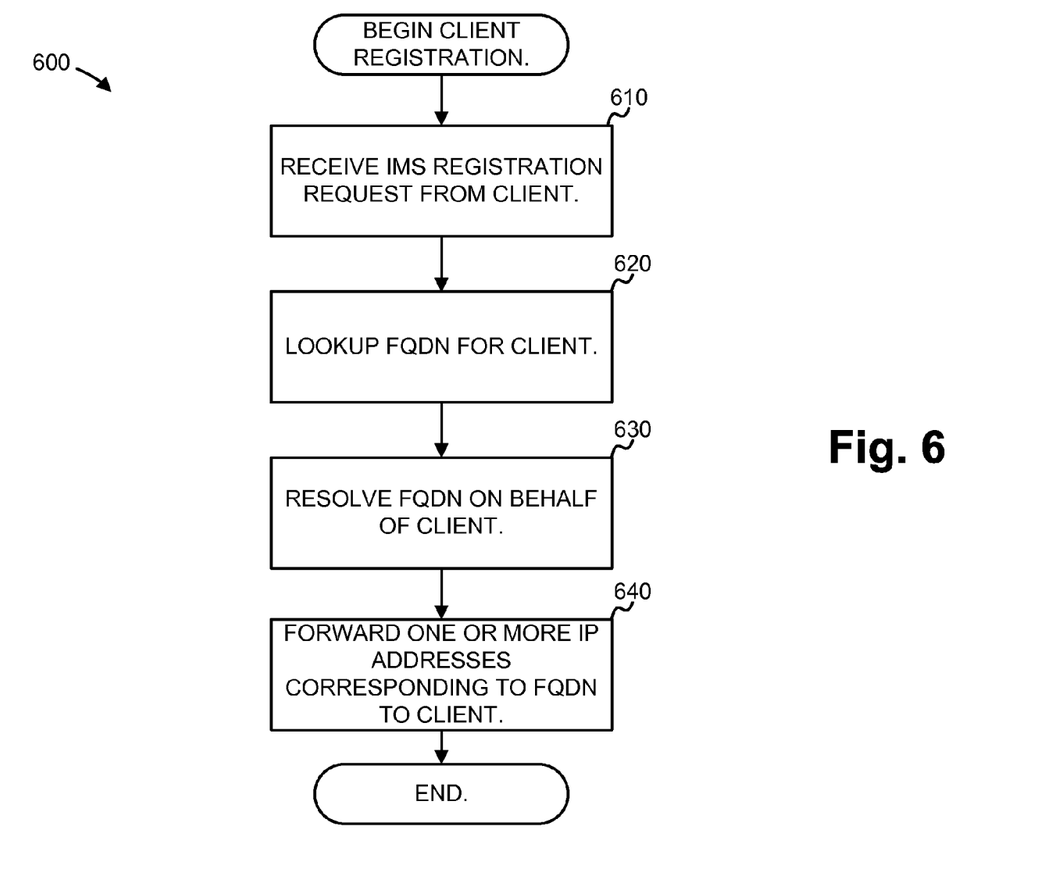
FIGS. 6 and 7 are diagrams illustrating exemplary processes for registering a client device for IMS services.

FIG. 6 is a diagram illustrating an exemplary process 600 for registering a client device 110 for IMS services. Process 600 may be performed by one or more network devices in network 105 and by one or more components of each of the network devices 200. For example, process 600 may be performed by HSS 140, including available CSCF servers storage component 310 and client registration response component 320, and by PGW 150.

Process 600 may include receiving an IMS registration request from one of client devices 110 (block 610). From the point of view of the client device, the registration may generally include the client device "attaching" to the radio access network (e.g., the wireless portion of network 205) and then forming a connection with one of P-CSCF servers 130, which may serve as the initial SIP proxy for the client device into the IMS system. In one implementation, client registration response component 320 of HSS 140 may receive the registration request.

Process 600 may further include looking up a FQDN, corresponding to one or more P-CSCF servers 130, for client device 110 (block 620). The FQDN may be determined based on table 400. For example, client registration response component 320 may choose an available FQDN from table 400 based on, for instance, network load, the location of the client device, the roaming status of the client device, other network-based information, or client-based policy information. In an alternative implementation, client registration response component 320 may be configured to use a single FQDN for all IMS registration requests. In this situation, the "lookup" performed in block 620 may correspond to a memory access for the parameter or variable that holds the FQDN.

Process 600 may further include resolving of the FQDN on behalf of client device 110 (block 630). Resolving the FQDN may include translating the FQDN into a numerical IP address. In one implementation, HSS 140 may transmit a message to PGW 150 that passes the FQDN to PGW 150. PGW 150 may then perform the DNS resolution, such as by submitting a DNS query to DNS server 160. Alternatively, the FQDN may be forwarded to client device 110 for resolution. Forwarding the FQDN to PGW 150 may be particularly beneficial, however, as it may keep the DNS interactions off the radio access portion of network 105 (e.g., the wireless portion between base stations 120 and client devices 110), thus reducing the load on the radio access network.

Process 600 may further include forwarding the IP address obtained from the FQDN resolution to client device 110 (block 640). For example, PGW 150 may receive one or more IP addresses from DNS server 160 and forward the IP addresses to client device 110. In implementations in which client device 110 performs the DNS query, client device 110 may directly receive the IP addresses from DNS server 160. The association of multiple IP addresses with a single FQDN is supported by existing DNS server protocols. Typically, a DNS server may return all of the IP addresses associated with a FQDN to a requesting device.

Figure 7:
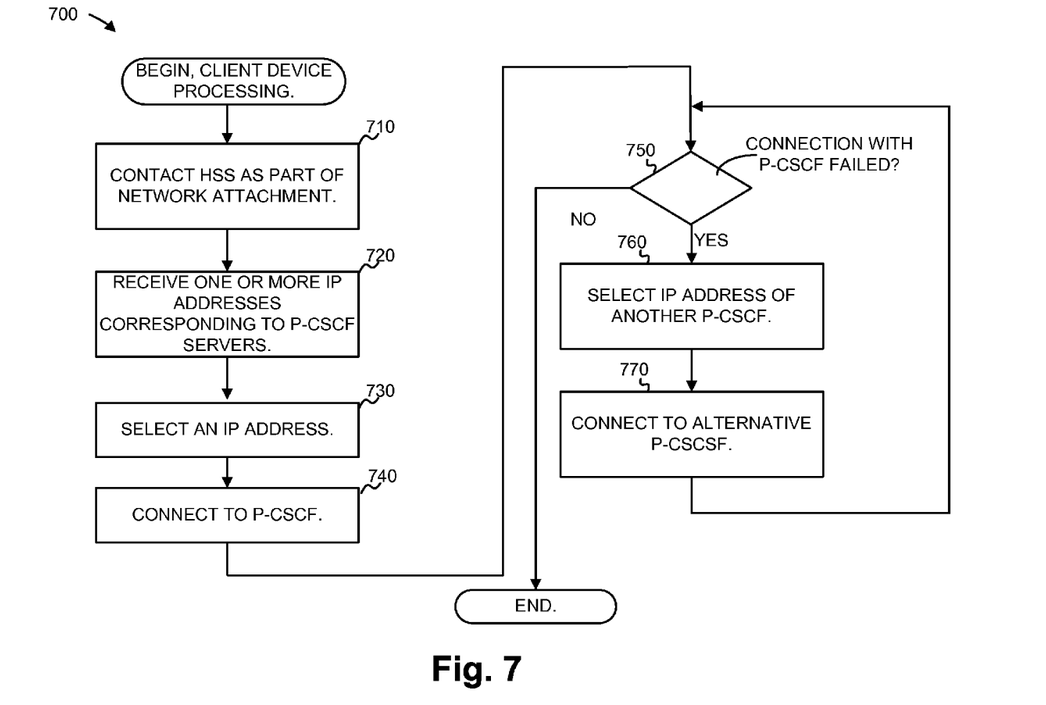

FIG. 7 is a diagram illustrating an exemplary process 700 for registering a client device 110 for IMS services. Process 700 may be performed, for example, by IMS registration component 510 and IP address selection component 520 of client device 110.

Process 700 may include contacting HSS 140 to begin network attachment of the client device to the network (block 710). The attachment process may be performed by IMS registration component 510 of client device 110. It can be appreciated that attaching to the network may include additional communications not particularly discussed herein. For example, client device 110, upon initialization, may first authenticate and attach itself to a base station 120.

Process 700 may further include receiving one or more IP addresses corresponding to P-CSCF servers 130 (block 720).

As mentioned previously in reference to process 600, the IP addresses may be received as the result of a DNS resolution for a FQDN that corresponds to one or more of P-CSCF servers 130. IP address selection component 520 may receive the one or more IP addresses.

Process 700 may further include selecting an IP address from the received IP addresses (block 730). IP address selection component 520 may, for example, select the first IP address in the received set of IP addresses. Other techniques for selecting an IP address may be used, such as a random selection.

Process 700 may further include connecting to the P-CSCF server corresponding to the selected IP address (block 740). Client device 110 may, for example, send a REGISTER message to the P-CSCF, which may result in connection of client device 110 with the P-CSCF.

The connection with the network may fail, or the REGISTER message sent to the P-CSCF may not result in registration. In this situation, (block 750—YES), client device 110 may select another IP address from the received IP addresses (block 760). This IP address may correspond to an alternative P-CSCF server 130 (block 760). Process 700 may further include connecting to the alternative P-CSCF (block 770). Client device 110 may, for example, send a REGISTER message to the alternate P-CSCF, which may result in the registration of client device 110 for IMS services.

Figure 8:
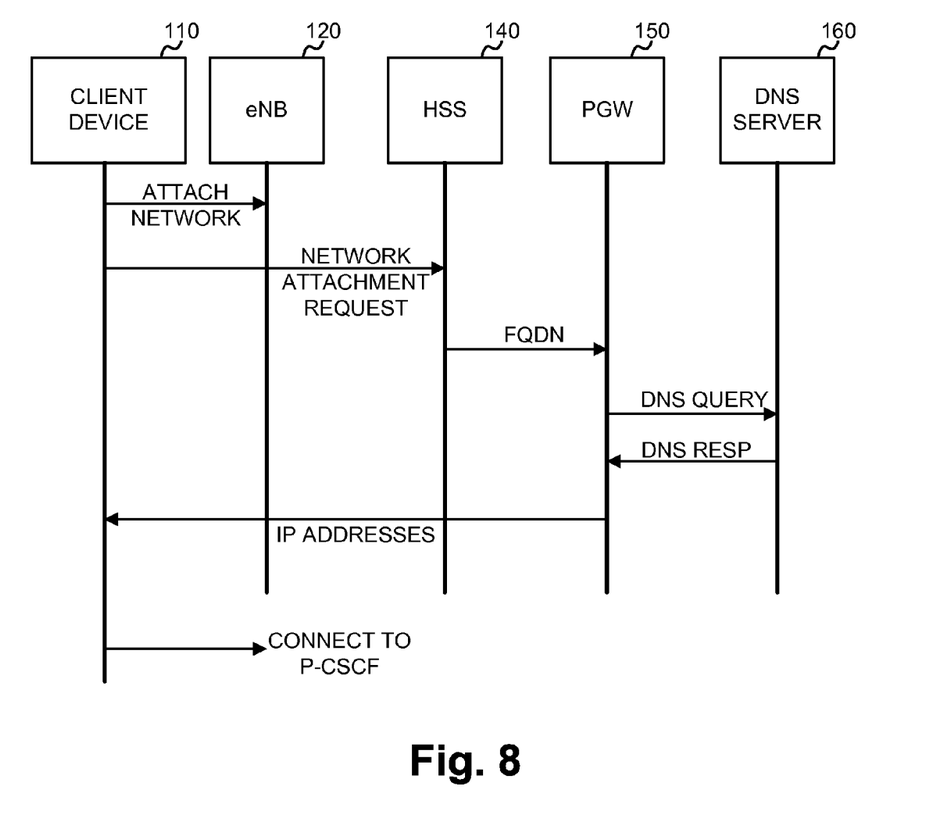
FIG. 8 is a network flow diagram illustrating exemplary communications through which a client device registers for IMS services.

FIG. 8 is a network flow diagram illustrating exemplary communications through which a client device registers for IMS services.

As shown in FIG. 8, a client device may initially attach to a network, such as a network 105, by communicating with base station 120 (ATTACH NETWORK). Client device 110 may need to register for IMS services. Client device 110 may send a request to HSS 140 to receive one or more IP addresses that the client device should use in connecting to P-CSCF servers 130 (NETWORK ATTACHMENT REQUEST). In response, client 110 may receive a number of IP address retrieved as part of a DNS query. In particular, as shown in FIG. 8, HSS 140 may respond to the network attachment request by initiating a DNS query for a FQDN. The FQDN may be transmitted to PGW 150, which may make the DNS query to DNS server 160, potentially on behalf of client device 110. DNS server 160 may respond to the DNS query (DNS response) with one or more IP addresses corresponding to the FQDN. The IP addresses may be transmitted to client device 110 (IP ADDRESSES), which may select one of the addresses to connect to a P-CSCF server 130.

As described above, a domain name, such as a FQDN, may be used to manage SIP servers (e.g., P-CSCF servers 130) to which client devices connect. By using a domain name to manage the SIP servers, traffic management and the possibility of SIP server failure can be effectively managed. For example, if the SIP server happens to be out-of-service or congested, a different SIP server may be automatically contacted. This may allow the network to select the SIP servers for a mobile device based on location-based factors or other factors. A location-based selection may be based on the location of the subscriber or the roaming status of the subscriber. The other factors may include network traffic conditions or other network device features.

The foregoing description provides illustration and description, but is not intended to be exhaustive or to limit the invention to the precise form disclosed. Modifications and variations are possible in light of the above teachings or may be acquired from practice of the invention.

While a series of blocks has been described with regard to FIGS. 6 and 7, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
  maintaining, by a network device, information identifying a plurality of fully qualified domain names (FQDNs), each fully qualified domain name (FQDN) of the plurality of FQDNs, corresponding to one or more session initiation protocol (SIP) servers;
  receiving, by the network device, a request to attach a client device to a network for Internet Protocol (IP) multimedia subsystem (IMS) services;
  selecting, by the network device and based on the information identifying the plurality of FQDNs, a first FQDN from the plurality of FQDNs, the first FQDN corresponding to a first group of SIP servers to process SIP signaling packets for the client device; and
  transmitting, by the network device and based on the request to register the client device, a message initiating resolution of the first FQDN into a plurality of IP addresses, each of the plurality of IP address corresponding to one of the first group of SIP servers.

2. The method of claim 1, where the client device includes a mobile telephone, and
  where selectin the first FQDN includes:
    selecting the first FQDN based on a location of the mobile telephone.

3. The method of claim 1, where the first group of SIP servers include SIP proxy devices that function as an initial contacting server for the attachment of the client device to the network for IMS services.

4. The method of claim 1, where the first group of SIP servers include proxy call session control function (P-CSCF) servers.

5. The method of claim 1, where selecting the first FQDN includes:

selecting the first FQDN based on one or more of a location of the client device, a network load, or a network roaming status of the client device.

6. The method of claim 1, where transmitting the message initiating resolution of the first FQDN additionally includes:
forwarding information identifying the first FQDN to a gateway for resolution of the first FQDN on behalf of the client device.

7. The method of claim 1, where transmitting the message initiating resolution of the first FQDN additionally includes:
forwarding information identifying the first FQDN to the client device for resolution of the first FQDN by the client device.

8. The method of claim 1, where the network device includes a home subscriber server.

9. A network device comprising:
a storage component to:
maintain information relating to an availability of session initiation protocol (SIP) servers that provide Internet Protocol (IP) multimedia subsystem (IMS) services to a client device; and
one or more processors to:
determine, based on information maintained by the storage component, a fully qualified domain name (FQDN) corresponding to one or more of the SIP servers based on a request being received by the network device from the client device, and
transmit a message initiating resolution of the FQDN into a plurality of IP addresses, each of the plurality of IP address corresponds to one of the one or more SIP servers.

10. The network device of claim 9, where the network device includes a home subscriber server.

11. The network device of claim 9, where the one or more SIP servers each include a SIP proxy device that functions as an initial contacting server for attachment of the client device to a network for IMS services.

12. The network device of claim 9, where the one or more SIP servers each include a proxy call session control function (P-CSCF) server.

13. The network device of claim 9, where the storage component further includes:
a computer-readable medium that stores a plurality of FQDNs, each of the plurality of FQDNs corresponding to one or more SIP servers, and information relating to the status of the FQDNs.

14. The network device of claim 9, where, when transmitting the message initiating resolution of the FQDN, the one or more processors are to:
forward the FQDN to a gateway for resolution of the FQDN on behalf of the client device.

15. The network device of claim 9, where, when transmitting the message initiating resolution of the FQDN, the one or more processors are to:
forward the FQDN to the client device for resolution of the FQDN by the client device.

16. A network device comprising:
a memory to store a plurality of instructions; and
a processor to execute instructions in the memory to:
receive a request to register a client device for Internet Protocol (IP) multimedia subsystem (IMS) services;
select, based on one or more of a location of the client device, a network load, or a network roaming status of the client device, a fully qualified domain name (FQDN), from information identifying a plurality of FQDNs, the FQDN corresponding to one or more session initiation protocol (SIP) servers that process SIP signaling packets for the client device; and
transmit, based on the request to register the client device, a message initiating resolution of the FQDN into a plurality of IP addresses, each of the plurality of IP addresses corresponding to one of the one or more SIP servers and where one of the plurality of IP addresses being subsequently used by the client device to attach to a network for the IMS services.

17. The network device of claim 16, where the one or more SIP servers each include a SIP proxy device that functions as an initial contacting server for the attachment of the client device to the network for IMS services.

18. The network device of claim 16, where, when transmitting the message initiating resolution of the FQDN, the processor executes instruction in the memory to:
forward the FQDN to a gateway for resolution of the FQDN on behalf of the client device.

19. The network device of claim 16, where, when transmitting the message initiating resolution of the FQDN, the processor executes the instructions to:
forward the FQDN to the client device for resolution of the FQDN by the client device.

20. A non-transitory computer-readable medium comprising:
one or more instructions which, when executed by a processor, cause the processor to:
store information identifying a plurality of fully qualified domain names, each fully qualified domain name, of the plurality of fully qualified domain names, being associated with one or more session initiation protocol (SIP) servers,
receive a request associated with connecting a client device to a network to provide Internet Protocol (IP) multimedia (IMS) services to the client device,
determine, based on the stored information, an availability of each fully qualified domain name, of the plurality of fully qualified domain names, to identify a group of available fully qualified domain names,
select a first fully qualified domain name from the identified group of available fully qualified domain names, the first fully qualified domain name being associated with a group of the SIP servers,
resolve the first fully qualified domain name into a plurality of IP addresses that correspond to the group of the SIP servers, and
transmit information identifying the plurality of IP addresses to the client device.

21. The non-transitory computer-readable of claim 20, further comprising:
one or more instructions which, when executed by the processor, cause the processor to receive, from each of the SIP servers, information identifying a load of the SIP servers, and
where the one or more instructions to determine the availability of each fully qualified domain name, of the plurality of fully qualified domain names include:
one or more instructions to determine the availability of each fully qualified domain name, of the plurality of fully qualified domain names, based on the information identifying the load of the SIP servers.

22. The non-transitory computer-readable medium of claim 21, where the information identifying the load of the SIP servers includes information identifying a quantity of devices assigned to each of the SIP servers.

* * * * *